Patented May 2, 1944

2,347,667

UNITED STATES PATENT OFFICE 2,347,667

ISOMERIZATION OF CONJUGATED DIOLEFINS

David Craig, Silver Lake Village, Ohio, assignor, by mesne assignments, to The B. F. Goodrich Company, Akron, Ohio, a corporation of New York No Drawing. Application September 22, 1941, Serial No. 411,888

8 Claims. (Cl. 260—680)

This invention relates to the isomerization of conjugated diolefins, particularly piperylene, and has as its principal object the conversion of the high-boiling piperylene isomer, believed to be cis-piperylene, to the low-boiling piperylene isomer, believed to be trans-piperylene.

I have disclosed in my copending application Serial No. 389,469 filed April 19, 1941, that piperylene may be reacted with sulfur dioxide to form a monomeric sulfone. I have now discovered that there are two geometric isomers of piperylene having the following constants:

| B. P.$_{760}$ | $n_D^{20}$ | $D_4^{20}$ |
|---|---|---|
| 43.6° C.±0.2° | 1.4360 | 0.6921 |
| 41.5° C.±0.2° | 1.4300 | 0.6784 |

Both of these isomers react with sulfur dioxide to form monomeric sulfones, although the low-boiling isomer reacts much more readily. I have now discovered that the monomeric sulfones prepared from the isomeric forms of piperylene are identical, and that no matter which piperylene isomer is employed to form the sulfone, decomposition of the sulfone yields the low-boiling isomer of piperylene.

Although piperylene and sulfone dioxide will react at room temperature the reaction between the high-boiling piperylene and sulfur dioxide is preferably effected at elevated temperatures and pressures, and may be carried out in either the liquid or the gas phase. The formation of polymeric sulfones may be largely prevented by the use of a large excess of sulfur dioxide, from 5 to 20 or more mols of sulfur dioxide per mole of piperylene for instance.

The formation of polymeric sulfones is also prevented by the presence of a polymerization inhibitor such as a diaryl amine such as phenyl-beta-naphthylamine or a polyhydric phenol such as hydroquinone, catechol, pyrogallol, etc.

As a specific example of the method of this invention, 10 g. of piperylene boiling at from 43.5° to 43.6° C., 125 g. of sulfur dioxide, and 5 g. of phenyl-beta-naphthylamine were cooled to about −70° C. and placed in a stainless steel autoclave. The autoclave was sealed, allowed to stand at room temperature for 30 min., and then heated at 90°–95° C. for three hours in a hot water bath. After the autoclave was cooled to room temperature and opened, the contents were heated to 60° C. to remove the unreacted materials. The residue was a dark brown oil consisting mainly of monomeric piperylene sulfone.

The decomposition of the piperylene sulfone was effected by heating at atmospheric pressure. Decomposition started at about 80° C., and proceeded quite rapidly at 105° C. The mixture of sulfur dioxide and piperylene obtained by the decomposition was distilled in the presence of a small amount of phenyl-beta-naphthylamine to remove the sulfur dioxide. The piperylene remaining in the flask was washed with dilute sodium hydroxide to remove the last traces of sulfur dioxide, dried, and redistilled. The major portion of the distillate came over at 41.5° C. and had a refractive index of 1.4304 showing that it was nearly pure low-boiling piperylene.

Although the monomeric piperylene sulfone was isolated in the above specific example, the rearrangement of high-boiling to low-boiling piperylene may be effected without the isolation of any intermediate products. For example, a mixture of high-boiling piperylene and sulfur dioxide together with a small amount of retarder of polymerization may be distilled through a fractionating column under pressure. Under these conditions, the high-boiling piperylene rearranges to the low-boiling piperylene within the column, and a mixture of low-boiling piperylene and sulfur dioxide may be removed from the top of the column. Such an operation may be easily made continuous, and provides a very convenient method of effecting the isomerization.

A further convenient procedure is to introduce the high-boiling piperylene containing an inhibitor near the top of a fractionating column while sulfur dioxide is introduced near the bottom. The column is then operated at a temperature sufficiently high to effect the isomerization. A mixture of sulfur dioxide and low-boiling isomer may be removed from the top of the column. A suitable solvent may be added with the high-boiling isomer, and removed at the bottom of the column along with by-products and inhibitor.

It is not necessary that pure high-boiling piperylene be used as the starting material in the process herein described, for mixtures of hydrocarbons work equally well. A mixture of high-boiling and low-boiling isomers, for instance, may be reacted with sulfur dioxide, and pure low-boiling piperylene may be obtained by the decomposition of the monomeric sulfone by heating and/or lowering the pressure. Furthermore a mixture of high-boiling piperylene and cyclopentene or of piperylene isomers and cyclopentene may be reacted with sulfur dioxide in the manner described in the first example. The reaction mixture is heated to about 60° C. at atmospheric pressure to remove the sulfur dioxide, cyclopentene, and unreacted piperylene. The piperylene sulfone is then decomposed to yield a mixture of low-boiling piperylene and sulfur dioxide from which pure low-boiling piperylene may be obtained by distillation or extraction with an alkali. When this reaction is effected in a column, it is convenient to operate in such a way that the impurities are removed from the top of the column while the diolefin is removed from the bottom as the sulfone.

Although the specific examples have been concerned with the conversion of slow-reacting piperylene to a more reactive form, the same method is applicable to slow-reacting forms of other straight-chain conjugated diolefins exhibiting geometric isomerism such as hexadiene-1,3.

Although I have herein described specific embodiments of the invention, I do not intend to limit the invention solely thereto, for many variations and modifications which will be apparent to those skilled in the art are within the spirit and scope of the invention as defined in the appended claims.

I claim:

1. The method of isomerizing piperylene which comprises reacting substantially pure high-boiling piperylene with sulfur dioxide to form monomeric piperylene sulfone, and decomposing the sulfone to form low-boiling piperylene.

2. The method of isomerizing piperylene which comprises reacting substantially pure high-boiling piperylene with an excess of sulfur dioxide to form monomeric piperylene sulfone, and heating the sulfone to liberate low-boiling piperylene.

3. The method of isomerizing piperylene which comprises heating substantially pure high-boiling piperylene with an excess of sulfur dioxide and a polymerization inhibitor to form monomeric piperylene sulfone, decomposing the sulfone to form a mixture of low-boiling piperylene and sulfur dioxide, and separating the low-boiling piperylene from the sulfur dioxide.

4. The method of preparing substantially pure low-boiling piperylene from a mixture of hydrocarbons consisting of high-boiling piperylene and cyclopentene which comprises treating said mixture with sulfur dioxide to convert the high-boiling piperylene into monomeric piperylene sulfone, separating the cyclopentene from the sulfone, decomposing the sulfone to form a mixture of low-boiling piperylene and sulfur dioxide, and separating the low-boiling piperylene from the sulfur dioxide.

5. The method of preparing substantially pure low-boiling piperylene from a mixture of hydrocarbons consisting of high-boiling piperylene, low-boiling piperylene and cyclopentene which comprises treating said mixture with sulfur dioxide to form monomeric piperylene sulfone from both the low-boiling and high-boiling piperylene, separating the cyclopentene from the sulfone, decomposing the sulfone to form a mixture of low-boiling piperylene and sulfur dioxide, and separating the low-boiling piperylene from the sulfur dioxide.

6. The method of preparing substantially pure low-boiling piperylene from a mixture of hydrocarbons comprising high-boiling piperylene and low-boiling piperylene and no other conjugated diolefins, which comprises treating said mixture with sulfur dioxide to form monomeric piperylene sulfone from both the low-boiling and high-boiling piperylene, decomposing the sulfone to form a mixture of sulfur dioxide and low-boiling piperylene, and separating the low-boiling piperylene from the sulfur dioxide.

7. The method of preparing substantially pure low-boiling piperylene from a mixture of hydrocarbons comprising high-boiling piperylene and no other conjugated diolefins, which comprises treating said mixture with sulfur dioxide to form monomeric piperylene sulfone from the high-boiling piperylene, decomposing the sulfone to form a mixture of low-boiling piperylene and sulfur dioxide, and separating the low-boiling piperylene from the sulfur dioxide.

8. The method of isomerizing conjugated diolefins which comprises reacting a hydrocarbon material comprising a slow-reacting isomer of a conjugated diolefin exhibiting geometric isomerism but free from conjugated diolefins not exhibiting geometric isomerism, with sulfur dioxide to form a monomeric sulfone of the slow-reacting isomer, and decomposing the sulfone to regenerate a more reactive isomer.

DAVID CRAIG.